United States Patent
Cheng et al.

(10) Patent No.: US 9,427,721 B2
(45) Date of Patent: Aug. 30, 2016

(54) COOL HYDROGEN-PROPELLED CYCLONE QUENCH BOX

(75) Inventors: Zhenmin Cheng, Beijing (CN); Shengshan Li, Beijing (CN); Xuehua Li, Beijing (CN); Guoqi Wang, Beijing (CN); Zhenyuan Wang, Beijing (CN); Zibin Huang, Beijing (CN); Jun Zhu, Beijing (CN); Yu Long, Beijing (CN); Xiaobo Liu, Beijing (CN); Kun Yu, Beijing (CN); Hongying Wang, Beijing (CN)

(73) Assignees: PetroChina Company Limited, Beijing (CN); CNPC East China Design Institute, Qingdao (CN)

( * ) Notice: Subject to any disclaimer, the term of this patent is extended or adjusted under 35 U.S.C. 154(b) by 0 days.

(21) Appl. No.: 14/404,451

(22) PCT Filed: Jun. 15, 2012

(86) PCT No.: PCT/CN2012/000833
§ 371 (c)(1),
(2), (4) Date: Nov. 27, 2014

(87) PCT Pub. No.: WO2013/177722
PCT Pub. Date: Dec. 5, 2013

(65) Prior Publication Data
US 2015/0110686 A1   Apr. 23, 2015

(30) Foreign Application Priority Data

May 28, 2012   (CN) .......................... 2012 1 0168308

(51) Int. Cl.
*B01J 19/24* (2006.01)
*B01J 19/18* (2006.01)
(Continued)

(52) U.S. Cl.
CPC .......... *B01J 19/2405* (2013.01); *B01F 5/0057* (2013.01); *B01F 15/063* (2013.01); *B01J 8/0496* (2013.01); *B01J 19/18* (2013.01); *B01F 2015/061* (2013.01); *B01J 2208/00849* (2013.01)

(58) Field of Classification Search
CPC .... B01J 19/2405; B01J 19/24; B01J 8/0453; B01J 8/0496; B01J 8/0492; B01J 2208/00849; B01J 2208/00831; B01J 2208/00823
See application file for complete search history.

(56) References Cited

U.S. PATENT DOCUMENTS 4,960,571 A   10/1990   Bhagat et al.
5,403,560 A    4/1995   Deshpande et al.
(Continued)

FOREIGN PATENT DOCUMENTS

CN   2294771 Y   10/1998
CN   2448440 Y    9/2001
(Continued)

OTHER PUBLICATIONS

Zhang Shuguang, Mu Haitao, Hu Zhenghai and Lu Qingmao; Modification of Hydrocracker Reactor Internals[J]; Petroleum Processing and Petrochemicals;2000; vol. 30.11, p. 51-54.

*Primary Examiner* — Lessanework Seifu
(74) *Attorney, Agent, or Firm* — Eagle IP Limited; Jacqueline C. Lui

(57) ABSTRACT

A cool hydrogen-propelled cyclone quench box comprises: a mixing chamber (7) arranged at the center of a lower support plate (11); swirl tubes (6) arranged above the lower support plate (11) and outside the mixing chamber (7), the tubes being in tangential communication with the body of the mixing chamber (7) along a horizontal direction; a gas-liquid downcomer (5) perpendicularly arranged outside each swirl tube (6), the bottom portions of the downcomers and the outer walls of the swirl tubes (6) being in tangential communication along a perpendicular direction, and the top portions of the gas-liquid downcomers (5) being connected to fluid inlets (4) arranged on an upper support plate (3). The bottom end of a cool hydrogen branch pipe (8) is arranged outside each swirl tube (6), and is tangentially connected to the swirl tube (6) along a horizontal direction. By means of a flange (2) arranged on the upper support plate (3), the top ends of the cool hydrogen branch pipes (8) connect to a cool hydrogen pipe (1) arranged outside the upper support plate (3). Upper-level cyclone blades (12) are installed within the mixing chamber (7). The bottom ends of the blades (12) are perpendicularly arranged on the upper-level blade support plate (13). Lower-level cyclone blades (9) are installed at the mixing chamber (7) outlet; the bottom ends of the blades (9) are perpendicularly arranged on the lower-level blade support plate (10).

3 Claims, 1 Drawing Sheet

(51) Int. Cl.
*B01J 8/04* (2006.01)
*B01F 5/00* (2006.01)
*B01F 15/06* (2006.01)

(56) References Cited

U.S. PATENT DOCUMENTS

| | | |
|---|---|---|
| 5,462,719 A | 10/1995 | Pedersen et al. |
| 5,567,396 A | 10/1996 | Perry et al. |
| 5,756,055 A | 5/1998 | Kelly et al. |
| 7,112,312 B2 | 9/2006 | Chou |
| 2003/0157003 A1 | 8/2003 | Machado et al. |

FOREIGN PATENT DOCUMENTS

| | | |
|---|---|---|
| CN | 201058862 Y | 5/2008 |
| CN | 201140043 Y | 10/2008 |
| CN | 201660602 U | 12/2010 | a b　　　　　c

COOL HYDROGEN-PROPELLED CYCLONE QUENCH BOX

CROSS REFERENCE TO RELATED APPLICATIONS

This application is an U.S. National Stage application under 35 USC 371, which claims the priority to international application no. PCT/CN2012/000833, filed Jun. 15, 2012, which claims the benefit of Chinese patent application No. 201210168308.8 filed May 28, 2012. The entire disclosures of the aforesaid international application no. PCT/CN2012/000833 and Chinese patent application No. 201210168308.8 are hereby incorporated by reference herein.

FIELD

The invention relates to gas-liquid mixing and heat transfer between the cool hydrogen for a hydrofining or hydrocracking reactor and the hot fluid in the reactor. The present invention is also applied for mixing and heat transfer between gas-liquid phases or liquid-liquid phases at other different temperatures.

BACKGROUND

Hydrogenation reaction is an exothermic reaction. Therefore for the multi-bed hydrogenation reactor, as the temperature increases after the oil reacts with hydrogen in the upper bed, in order to meet the requirement of carrying on the hydrogenation reaction in the next bed, the temperature of mixture has to be controlled, i.e. reducing the temperature of reactant with cool hydrogen. The reactor becomes bigger in pace with the development of hydrogenation technique. And an un-evenly heating exchanging on the radial cross section of the catalytic bed may result in an un-evenly distribution of the material temperature. For instance, the radial temperature differences at the exits in the fourth bed and in the fifth bed in certain hydrocracking apparatus before modification are up to 37° C. and 39° C., respectively. Since the radial temperature difference is too big, a hot spot takes place in the lower portion of the fifth bed, and becomes lump, which significantly shorten the life cycle of the catalyst (Petroleum Processing and Petrochemicals, 2000, 31(11): 51-54). The hydrogenation reactions are mostly under the high temperature and high pressure working conditions, thus the equipment investment and maintenances cost will be greatly increased when the input amount of cool hydrogen and the space increase. Thus, the cool hydrogen has to be sufficiently mixed with hot reactant material such that it obtains a more uniform distribution of temperature and material in the next bed. Therefore, the high efficient heat exchanging between the cool hydrogen and reactant material is the prerequisite to sufficiently carry out the performance of the catalyst and to stable operate for the apparatus.

The structure of quench box is complicated. There are usually a number of technical features in one quench box, which makes it difficult to distinguish from each other. The quench box primarily is often categorized into 3 types as follows:

(1) Flowing Around Type which means that reactant sinks to the annular space outside the mixing chamber and enters the mixing chamber through the pores on the outer wall of mixing chamber, while cool hydrogen enters the mixing chamber through the pores on the inner wall of mixing chamber and is preliminary mixed with the reactant in the mixing chamber, then the mixture further flows around the quench cooler during which a uniform distribution of material and temperature is achieved.

(2) Baffling Type which means that the reaction medium and cool hydrogen enter the quench cooler from the annular channel on the upper end of quench cooler, then are baffled and discharged from the lower end of quench cooler, during which a uniform mixing of fluid is achieved.

(3) Rotary Vane Type which means that the quench box is equipped with vane, and the fluid is rotated and mixed under the drive of the vane.

Three patents, "Quench assembly design" (U.S. Pat. No. 4,960,571), published in 1990 by Exxon Research and Engineering company, "Multiphase mixing device with improved quench injection for inducing rotational flow" (US 20040234434), published in 2004, and "Quench box for a multi-bed, mixed-phase cocurrent downflow fixed-bed reactor" (U.S. Pat. No. 7,112,312), published in 2006, all comprises both technical features of "flow around" and "baffling". "Fluids mixing and distributing apparatus" (U.S. Pat. No. 5,403,560, U.S. Pat. No. 5,567,396) published in 1995 and 1996 by Texaco Inc., "Two phase fluid heat exchange" (U.S. Pat. No. 5,756,055) published in 1998 by UOP company and etc., are similar to above three patents. And the patent "Method and apparatus for mixing and distributing fluids in a reactor" (U.S. Pat. No. 5,462,719) proposed in 1995 by Atlantic Richfield Company has a typical rotary vane structure.

In summary, the design method of quench box described in above patents can be generalized into 2 principles: increasing retention time and baffling and impinging of the fluid in the quench box so as to achieve the purpose of fluid mixing and transferring heat. Although these methods is industrialized and brings about almost satisfying effect, there is still a problem of oversize in volume, which mainly results from that a high mixing efficien can only be achieved by combining various mixing manners. Obviously, it must start from improving the mixing manner, achieving multi-functional structure of the device, that is, combining the features of flowing-around, baffling and rotation, to develop a novel mixing device.

In order to better utilize the space volume in the reactor, Chinese Patent ZL 2006 2 0162611.7 introduce the concept of "cyclone" into the design of quench box, which converts the potential energy of the falling fluid into cyclone kinetic energy, increasing the turbulent intensity while prolonging the retention time. This patent is fundamentally different from the two-dimensional space cyclone quench box disclosed in ZL 97202630.4 and in ZL 00253961.6. Although this patent has breakthrough in concept, the oxygen absorbing efficien measured is 61.45%, which needs further improvement.

The hydraulic cyclone quench box ZL 2006 2 0162611.7 has following technical defects:

(1) The swirling intensity is insufficient. The cyclone mechanical energy of the patent totally comes from the kinetic energy of gas-liquid 2-phase fluid which flows downward from the upper bed through a downcomer, thus only a high gas-liquid flow velocity can produce enough mechanical energy.

(2) The mechanical energy of cool hydrogen is not utilized. Similar to today's most patent, cool hydrogen in this patent is also injected from the cool hydrogen pipe nozzle to the reactor. Therefore, the cool hydrogen is only served as a medium to be mixed, but not a power.

(3) The downcomer employs cylindrical pipe. In order to obtain the cyclone effect, the diameter of the downcomer is often less than ½ of the diameter of the swirl tube. In fact, the less the diameter of the swirl tube, the better the cyclone effect. Accordingly, the diameter of downcomer has to be decreased, which increases falling resistance of the gas-liquid mixing fluid.

(4) There is no mixing element provided inside the mixing chamber and at the exit of the mixing chamber. Although the downcomer is tangent to the mixing chamber, and fluid can flow into the mixing chamber in a cyclone manner, the different fluid flowing into the mixing chamber cannot be mixed because there is no mixing element provided inside the mixing chamber and at the exit of the mixing chamber.

SUMMARY

The objective of the present invention is to provide a cool hydrogen-propelled cyclone quench box, such that the cool hydrogen is not only served as cooling medium, but also a power to propel gas-liquid to swirl. The gas-liquid downcomer is modified from cylindrical to rectangle in order to solve the restriction problem caused by two cylindrical pipe vertical tangent to each other. Swirling vanes are amounted in the mixing chamber and at exit of the mixing chamber to improve the degree of mixing of the fluid.

The cool hydrogen-propelled cyclone quench box according to the present invention comprises cool hydrogen pipe, gas-liquid downcomer, swirl tube, mixing chamber, upper support plate, lower support plate, cool hydrogen branch pipe, upper-level cyclone blade, lower-level cyclone blade, upper layer vane support plate and lower layer vane support plate; the cylindrical mixing chamber is arranged at the center of the round lower support plate, three cylindrical swirl tubes are arranged at outside of the mixing chamber on the lower support plate with a interval of 120° from each other, and are tangentially connected to the body of the mixing chamber along a horizontal direction; three rectangular gas-liquid downcomers are perpendicularly arranged at the outside of the swirl tubes, the bottom of the downcomer is tangentially connected to the outer wall of the swirl tube along a perpendicular direction; the upper portion of the gas-liquid downcomer is connected to fluid inlet located on the upper support plate; the lower ends of three cool hydrogen branch pipes are located at the outside of the swirl tube and tangentially connected to the swirl tube along a horizontal direction; the upper end of the cool hydrogen branch pipe are connected to the cool hydrogen pipe 1 outside the upper support plate through a flange on the upper support plate; 4 to 6 curved upper-level cyclone blades are amounted in the mixing chamber, the bottom of the curved upper-level cyclone blades are perpendicularly arranged on the upper layer vane support plate, 4 to 6 curved lower-level cyclone blades, which are curved in a reverse direction, are amounted at the exit of the mixing chamber, and the bottom of curved lower-level cyclone blade is perpendicularly arranged on the lower layer vane support plate.

The width of the gas-liquid downcomer is equal to the diameter of the swirl tube, the position of intersection takes up half of the circumference.

The diameter of said cool hydrogen branch pipe is equal to ¼ to ⅓ of the diameter of the swirl tube.

The operating principle of the present application is as follows:

The cool hydrogen from outside the reactor enter quench box through cool hydrogen pipe, and the high temperature gas-liquid mixing fluid from the upper bed tangentially flows into the swirl tube through rectangular opening on the support plate via the bottom of gas-liquid downcomer, the one dimensional flow of the fluid turns to three-dimensional cyclone. In order to increase the intensity of the cyclone, the cool hydrogen tangentially enters swirl tube along a horizontal direction. To ensure that the cool hydrogen and gas-liquid fluid rotate in the same direction, the both gas-liquid downcomer and the cool hydrogen branch pipe are located outside of the swirl tube. The fluid flowing from swirl tube enters the mixing chamber in a tangential manner so as to carry out a second cyclone. In order to improve the mixing effect, 4 to 6 inward curved cyclone vanes are amounted in the mixing chamber and 4 to 6 reversely curved cyclone vanes are amounted at the exit of the mixing chamber, throwing out the fluid.

Wherein: 1—cool hydrogen pipe 2—flange 3—upper support plate 4—fluid inlet 5—gas-liquid downcomer 6—swirl tube 7—mixing chamber 8—cool hydrogen branch pipe 9—lower-level cyclone blade 10—lower-level blade support plate 11—lower support plate 12—upper-level cyclone blade 13—upper-level blade support plate

DETAILED DESCRIPTION

Figure 1:
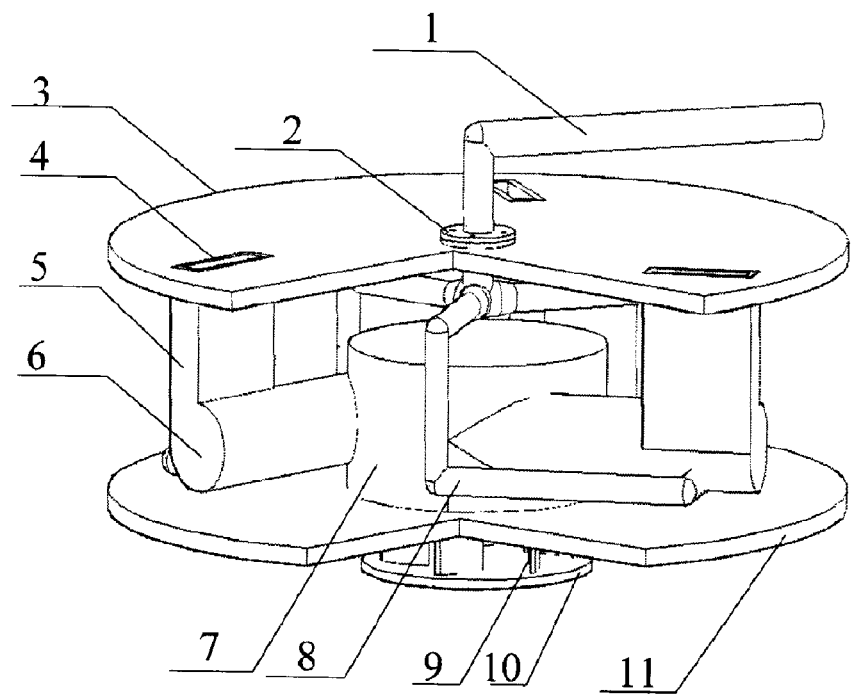
FIG. 1 is a schematic diagram viewing the structure of the quench box.
Figure 2:
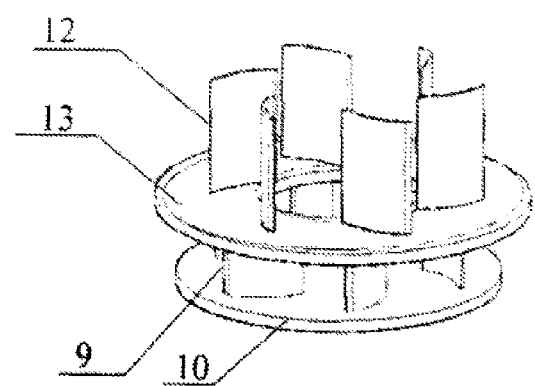
FIG. 2 is a schematic diagram viewing the structure of the mixing chamber.
Figure 2:
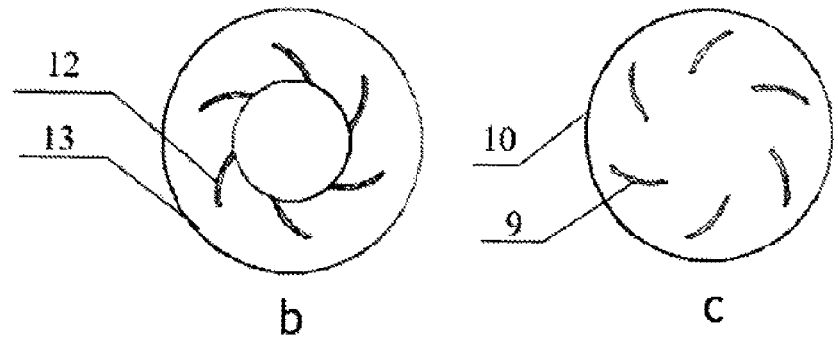

As shown in FIG. 1, the cool hydrogen-propelled cyclone quench box according to the present invention comprises cool hydrogen pipe 1, gas-liquid downcomer 5, swirl tube 6, mixing chamber 7, upper support plate 3, lower support plate 11, cool hydrogen branch pipe 8, upper-level cyclone blade 12, lower-level cyclone blade 9, upper layer vane support plate 13 and lower layer vane support plate 10; the cylindrical mixing chamber 7 is provided at the center of the round lower support plate 11, three cylindrical swirl tubes 6 are provided at outside of the mixing chamber 7 on the lower support plate with a interval of 120° from each other, and are tangentially connected to the body of the mixing chamber 7 along a horizontal direction; three rectangular gas-liquid downcomers 5 are perpendicularly arranged at the outside of the swirl tubes 6, the bottom of the downcomer is tangentially connected to the outer wall of the swirl tube 6 along a perpendicular direction; the upper portion of the gas-liquid downcomer 5 is connected to fluid inlet 4 located on the upper support plate 3; the lower ends of three cool hydrogen branch pipes 8 are located at the outside of the swirl tube 6 and are tangentially connected to the swirl tube 6 along a horizontal direction; the upper end of the cool hydrogen branch pipe 8 are connected to the cool hydrogen pipe 1 outside the upper support plate 3 through a flange 2 on the upper support plate 3; 4 to 6 curved upper-level cyclone blades 12 are amounted in the mixing chamber 7, the bottom of the curved upper-level cyclone blades 12 are perpendicularly arranged on the upper layer vane support plate 13, 4 to 6 curved lower-level cyclone blades 9, which are curved in a reverse direction, are amounted at the exit of the mixing chamber, and the bottom of curved lower-level cyclone blade is perpendicularly arranged on the lower layer vane support plate 10.

INDUSTRIAL APPLICABILITY

Since mass transmission is similar to heat transmission in a view of physical nature, the effect of heat transmission for the quench box can be reflected by measuring the effect of gas-liquid phase mass transmission.

The test gas-liquid mass transmission can be carried out by using oxygen absorption method. Before test, the tap water is deoxidated by anhydrous sodium sulfite as oxygen scavenger, and copper sulphate is used as a catalyst for the deoxidation reaction such that the water used in the test is in a lean oxygen state (less than 1.5 mg/L). The lean oxygen water is injected from the top into the reactor, and then is mixed and carried out the mess transmission with air (oxygen con. 21%) in the quench box. The dissolved oxygen in the water at inlet and outlet of the quench box is measured by dissolved oxygen analyzer. The mixing mess transmission property of the quench box can be characterized by oxygen absorption efficiency which is obtained according to the ratio of actual increment of the oxygen concentration to the theoretical maximum increment of the oxygen concentration.

The present invention uses a quench box with a diameter of 1 meter equipped with three swirl tube (with a interval of 120°) to carry out the measurement for the test, and the measuring subject is the pressure drop and the oxygen absorption efficiency. The water flow rate and air flow rate are adjusted during the test, wherein the air flow rate consists of the main part air and the lateral line air (represents the cool hydrogen), the results of measurement are shown in Table 1 and Table 2. In which, the lateral line air is 0 in Table 1, which means the cool hydrogen exhibits no propelling effect. Comparing Table 1 to Table 2, it can be seen that the addition of the cool hydrogen in lateral line can improve the efficiency of gas-liquid mess transmission, and the oxygen absorption efficiency is increased by approximately 20% in low gas-liquid flow rate, and approximately 15% in high gas-liquid.

TABLE 1

The measurement results for the mixing efficiency of quench box with a diameter of 1 meter (lateral line cool hydrogen = 0%).

| Test temperature (° C.) | The saturated oxygen con. In water (mg/L) | The amount of water flow rate | The amount of air flow rate | The oxygen con. at inlet (mg/L) | The oxygen con. at outlet (mg/L) | Pressure drop of the quench box in kPa | The oxygen absorption efficiency/ (%) |
|---|---|---|---|---|---|---|---|
| 6.0 | 12.42 | 8 | 100 | 0.85 | 6.64 | 0.124 | 50.04 |
| 6.0 | 12.42 | 8 | 200 | 0.85 | 6.78 | 0.268 | 51.27 |
| 6.0 | 12.42 | 8 | 300 | 0.85 | 7.05 | 0.526 | 53.60 |
| 6.0 | 12.42 | 8 | 400 | 0.85 | 8.02 | 0.815 | 62.00 |
| 6.0 | 12.42 | 8 | 500 | 0.85 | 8.65 | 1.166 | 67.38 |
| 6.0 | 12.42 | 11 | 100 | 0.76 | 6.55 | 0.185 | 49.63 |
| 6.0 | 12.42 | 11 | 200 | 0.76 | 6.81 | 0.430 | 51.91 |
| 6.0 | 12.42 | 11 | 300 | 0.76 | 7.53 | 0.798 | 58.04 |
| 6.0 | 12.42 | 11 | 400 | 0.76 | 7.96 | 1.194 | 61.72 |
| 6.0 | 12.42 | 11 | 500 | 0.9 | 8.81 | 1.644 | 68.70 |
| 6.0 | 12.42 | 14 | 100 | 0.9 | 6.47 | 0.282 | 48.31 |
| 6.5 | 12.26 | 14 | 200 | 0.85 | 7.10 | 0.654 | 54.78 |
| 6.5 | 12.26 | 14 | 300 | 0.85 | 7.67 | 1.122 | 59.81 |
| 6.5 | 12.26 | 14 | 400 | 0.85 | 8.50 | 1.603 | 67.06 |
| 6.5 | 12.26 | 14 | 500 | 0.75 | 8.91 | 2.243 | 70.89 |
| 6.5 | 12.26 | 17 | 100 | 0.72 | 6.73 | 0.471 | 52.04 |
| 6.5 | 12.26 | 17 | 200 | 0.72 | 7.40 | 0.950 | 57.89 |
| 6.8 | 12.17 | 17 | 300 | 0.8 | 8.02 | 1.505 | 63.49 |
| 6.8 | 12.17 | 17 | 400 | 0.8 | 8.53 | 1.991 | 67.98 |
| 7.0 | 12.11 | 17 | 500 | 1.15 | 9.07 | 2.696 | 72.31 |
| 7.0 | 12.11 | 20 | 100 | 1.15 | 7.17 | 0.685 | 54.97 |
| 7.0 | 12.11 | 20 | 200 | 1.2 | 7.80 | 1.181 | 60.50 |
| 6.8 | 12.17 | 20 | 300 | 1.2 | 8.28 | 1.852 | 64.54 |
| 6.8 | 12.17 | 20 | 400 | 0.92 | 8.76 | 2.435 | 69.70 |
| 6.8 | 12.17 | 20 | 500 | 0.92 | 9.29 | 3.262 | 74.44 |

TABLE 2

The measurement results for the mixing efficiency of quench box with a diameter of 1 meter (lateral line cool hydrogen = 50%).

| Test temperature (° C.) | The saturated oxygen con. In water (mg/L) | Water flow rate | The amount of air flow rate | The oxygen con. at inlet (mg/L) | The oxygen con. at outlet (mg/L) | Pressure drop of the quench box in kPa | The oxygen absorption efficiency/ (%) |
|---|---|---|---|---|---|---|---|
| 9.5 | 11.4 | 8 | 100 | 0.29 | 6.19 | 0.081 | 53.11 |
| 8.5 | 11.67 | 8 | 200 | 0.66 | 6.79 | 0.178 | 55.68 |
| 8.5 | 11.67 | 8 | 300 | 0.66 | 7.89 | 0.489 | 65.71 |
| 9.0 | 11.53 | 8 | 400 | 0.4 | 9.65 | 1.998 | 83.07 |
| 9.5 | 11.4 | 8 | 500 | 0.62 | 9.83 | 2.416 | 85.47 |

TABLE 2-continued

The measurement results for the mixing efficiency of quench box with a diameter of 1 meter (lateral line cool hydrogen = 50%).

| Test temperature (° C.) | The saturated oxygen con. In water (mg/L) | Water flow rate | The amount of air flow rate | The oxygen con. at inlet (mg/L) | The oxygen con. at outlet (mg/L) | Pressure drop of the quench box in kPa | The oxygen absorption efficiency/ (%) |
|---|---|---|---|---|---|---|---|
| 9.2 | 11.45 | 11 | 100 | 0.4 | 6.38 | 0.134 | 54.14 |
| 8.7 | 11.61 | 11 | 200 | 0.66 | 6.98 | 0.319 | 57.71 |
| 8.5 | 11.67 | 11 | 300 | 0.66 | 7.97 | 0.724 | 66.41 |
| 9.0 | 11.53 | 11 | 400 | 0.4 | 9.59 | 2.553 | 82.54 |
| 9.5 | 11.4 | 11 | 500 | 0.62 | 9.70 | 3.020 | 84.19 |
| 9.2 | 11.45 | 14 | 100 | 0.4 | 6.29 | 0.210 | 53.30 |
| 8.7 | 11.61 | 14 | 200 | 0.66 | 7.11 | 0.485 | 58.87 |
| 8.8 | 11.59 | 14 | 300 | 0.63 | 7.96 | 1.082 | 66.88 |
| 9.0 | 11.53 | 14 | 400 | 0.4 | 9.54 | 3.034 | 82.14 |
| 9.5 | 11.4 | 14 | 500 | 0.62 | 9.71 | 3.492 | 84.34 |
| 9.2 | 11.45 | 17 | 100 | 0.4 | 6.63 | 0.377 | 56.42 |
| 8.7 | 11.61 | 17 | 200 | 0.66 | 7.43 | 0.694 | 61.81 |
| 8.8 | 11.59 | 17 | 300 | 0.63 | 8.01 | 1.398 | 67.35 |
| 8.8 | 11.59 | 17 | 400 | 0.77 | 9.40 | 3.362 | 79.75 |
| 9.5 | 11.4 | 17 | 500 | 0.29 | 9.65 | 4.185 | 84.21 |
| 8.8 | 11.59 | 20 | 100 | 0.83 | 7.24 | 0.566 | 59.57 |
| 8.5 | 11.67 | 20 | 200 | 0.66 | 7.45 | 0.896 | 61.68 |
| 8.8 | 11.59 | 20 | 300 | 0.63 | 8.24 | 1.708 | 69.45 |
| 8.8 | 11.59 | 20 | 400 | 0.77 | 9.52 | 3.688 | 80.86 |
| 9.5 | 11.4 | 20 | 500 | 0.29 | 9.75 | 4.538 | 85.19 |

What is claimed:

1. A cool hydrogen-propelled cyclone quench box, comprising:
   a upper support plate;
   a round lower support plate;
   a cylindrical mixing chamber arranged at a center of the round lower support plate;
   four to six curved upper-level cyclone blades amounted in the cylindrical mixing chamber and having bottoms that are perpendicularly arranged on an upper layer vane support plate;
   four to six curved lower-level cyclone blades that are curved in a reverse direction to a curved direction of the curved upper-level cyclone blades, being amounted at an exit of the cylindrical mixing chamber, and having bottoms that are perpendicularly arranged on a lower layer vane support plate;
   three cylindrical swirl tubes arranged at outside of the cylindrical mixing chamber with an interval of 120° from each other, and tangentially connected to a body of cylindrical mixing chamber along a horizontal direction;
   three rectangular gas-liquid downcomers perpendicularly arranged outside of the cylindrical swirl tubes, having bottoms that are tangentially connected to an outer wall of the cylindrical swirl tube along a perpendicular direction, and having upper portions that are connected to a fluid inlet of the upper support plate;
   a cool hydrogen branch pipe arranged outside of the cylindrical swirl tubes and tangentially connected to the cylindrical swirl tube along a horizontal direction, and having an upper end that is connected to a cool hydrogen pipe outside of the upper support plate through a flange on the upper support plate.

2. The cool hydrogen-propelled cyclone quench box according to claim 1, characterized in that the width of the rectangular gas-liquid downcomer is equal to the diameter of the cylindrical swirl tube.

3. The cool hydrogen-propelled cyclone quench box according to claim 1, characterized in that the diameter of said cool hydrogen branch pipe is equal to ¼ to ⅓ of the diameter of the cylindrical swirl tube.

* * * * *